United States Patent [19]
Katohno et al.

[11] Patent Number: 5,296,994
[45] Date of Patent: Mar. 22, 1994

[54] MAGNETIC TAPE GUIDE MECHANISM FOR MAGNETIC RECORDING/REPRODUCING APPARATUS

[75] Inventors: Noboru Katohno; Yasuhiro Hashiguchi, both of Mito; Masabumi Katsunuma, Katsuta, all of Japan

[73] Assignees: Hitachi, Ltd., Tokyo; Hitachi Automotive Engineering Co., Ltd., Katsuta, both of Japan

[21] Appl. No.: 941,682

[22] Filed: Sep. 8, 1992

[30] Foreign Application Priority Data

Oct. 22, 1991 [JP] Japan .................................. 3-273753

[51] Int. Cl.⁵ .............................................. G11B 15/60
[52] U.S. Cl. ............................ 360/130.21; 360/130.23
[58] Field of Search .................... 360/84, 85, 95, 107, 360/130.22, 130.23, 130.21

[56] References Cited

U.S. PATENT DOCUMENTS 4,697,214  9/1987  Sasakawa ........................... 360/85

FOREIGN PATENT DOCUMENTS 3127340  7/1981  Fed. Rep. of Germany .
63-100658  5/1988  Japan .

Primary Examiner—A. J. Heinz
Attorney, Agent, or Firm—Antonelli, Terry, Stout & Kraus

[57] ABSTRACT

A magnetic tape guide mechanism for a magnetic recording/reproducing apparatus which includes a base having a large-inner-diameter hole with a larger inner diameter than a shaft hole, and a resilient synthetic resin member located in the large-inner-diameter hole and surrounding the shaft of a tape guide. As a result, a horizontally extended threaded hole and fixing screw conventionally required are eliminated and the overall construction is simplified. Moreover, the adjustment work is facilitated and the overall production cost of the components are substantially reduced.

2 Claims, 3 Drawing Sheets

MAGNETIC TAPE GUIDE MECHANISM FOR MAGNETIC RECORDING/REPRODUCING APPARATUS

BACKGROUND OF THE INVENTION

1. Field of the Invention

The present invention relates to a mounting structure of a magnetic tape guiding member for a magnetic recording/reproducing apparatus, particularly, a home video tape recorder (VTR).

2. Description of the Related Art

In a so-called magnetic recording/reproducing apparatus which performs magnetic recording and reproduction on a magnetic tape which is drawn out, for example, in a VTR, for reproduction of a software tape or a tape on which recording is conducted by another apparatus, the magnetically recorded pattern on a magnetic tape conforming to a predetermined standard must be suitable for various apparatuses. In present VTRs, the track width in the standard speed mode is 58 μm while that in the triple recording/reproducing time mode is 19 μm.

To achieve stable tracing of a magnetic head along the aforementioned widths, the precision of the associated parts must be increased. However, with the currently available techniques, it is impossible to increase the part precision to such a degree that the aforementioned specifications are attained. Consequently, manual and accurate fine adjustment is necessary in the final manufacturing process. The magnetic tape guiding mechanism provided by the present invention constitutes the portion of the magnetic recording/reproducing apparatus which requires this accurate fine adjustment.

As shown in FIG. 4, conventionally a magnetic tape 4 is accommodated in a cassette 1 in a state where it is wound around a supply reel 2 and a winding reel 3. The magnetic tape 4 is drawn out and is pulled around a rotating cylinder 5 on which a magnetic head 5a is mounted at a predetermined angle by tape guides 6 provided vertically on bases 10 when the bases 10 are driven by an adequate means (not shown) from positions (first positions) where they are accommodated in the cassette 1 in directions indicated by arrows A shown in FIG. 4. At that time, each of the bases 10 is accurately positioned on a chassis base 100 by an adequate means (not shown). The magnetic tape 4, pulled around the cylinder in the manner described above, is fed at a fixed speed in a direction indicated by an arrow B when a capstan 8 is rotated in a direction indicated by an arrow E (FIG. 4) by the rotation of a pinch roller 9 pressed against the capstan 8 with the magnetic tape between the pinch roller 9 and the capstan 8 in a direction indicated by an arrow D (FIG. 4), during which time magnetic recording and reproduction are conducted on the magnetic tape 4 by the magnetic head 5a mounted on the cylinder 5 which is rotating in a direction indicated by an arrow C (FIG. 4).

To obtain a standard magnetic recording pattern on the magnetic tape, it is necessary for the magnetic tape 4 to be fed in a highly accurate relative positional relationship with respect to the cylinder 5. However, it is impossible in the currently available techniques to process the cylinder 5, the chassis base 100 and the base 10 at the necessary high precision, and a certain amount of error (called a tolerance) is generated in each of the components. Hence, in order to feed the magnetic tape 4 in a highly accurate relative positional relationship relative to the cylinder 5, the position of the tape guide 6 provided vertically on the base 10 must be finely adjusted in the vertical direction relative to the base 10 (hereinafter referred to as a fine adjustment) to correct the conveyance path of the magnetic tape 4 relative to the cylinder 5.

A conventional tape guide mechanism of the type proposed in, for example, Japanese Utility Model Publication 2-27414 is shown in FIGS. 3 and 5. The tape guide 6 has a shaft 6d. A rotary roller 6c is fitted onto the shaft 6d. An upper flange 6a and a lower flange 6b are fixed on the shaft 6d near the two ends of the roller 6c at positions which are separated from each other by a predetermined interval. The upper and lower flanges 6a and 6b are provided to prevent removal of the roller 6c and to restrict the conveying position of the magnetic tape in the vertical direction. Below the lower flange 6b is provided an externally threaded portion 6e. The base 10 has an internally threaded portion 10a which engages with the externally threaded portion 6e of the tape guide 6, a shaft hole 10b, and a horizontal screw hole 10d which is connected to the shaft hole 10b.

The tape guide 6 is mounted on the base 10 by inserting the shaft 6d into the shaft hole 10b in the base 10 and then by threadedly engaging the externally threaded portion 6e with the internally threaded portion 10a. The entire tape guide 6 can be finely adjusted relative to the base 10 in the vertical direction utilizing the threaded engagement of these threaded portions by placing a flat point screw driver into a groove 6f in the upper flange 6a of the tape guide 6 and by slightly rotating the tape guide 6. The finely adjusted tape guide 6 is fixed by inserting a fixing screw 20 into the horizontal screw hole 10d and by pressing the distal end portion of the fixing screw 20 against the shaft 6d inserted into the shaft hole 10b.

One disadvantage of the above described proposed construction resides in the fact that, since the use of the fixing screw is necessary the horizontally extending threaded hole 10d must be drilled into the base 10.

Moreover, a further disadvantage resides in the fact that, in order to fix the tape guide 6, threading of the fixing screw into the horizontally extending threaded hole 10d is necessary thereby impairing the workability.

Furthermore, when the tape guide is finely adjusted, the fixing screw is temporarily loosened and, after the fine adjustment is completed, the fixing screw must be tightened again thereby requiring troublesome work.

By virtue of the above-noted disadvantages encountered in the prior art proposal, an increase in the production cost necessarily results.

SUMMARY OF THE INVENTION

An object of the present invention is to provide a magnetic tape guide mechanism which has a simple structure and which can readily be adjusted.

To achieve the above object, the present invention provides a magnetic tape guide mechanism for a magnetic recording/reproducing apparatus, which comprises a magnetic tape guide having a cylindrical rotary roller for conveying a magnetic tape drawn out from a cassette in a state where the magnetic tape is wound around a rotary cylinder with a magnetic head mounted thereon at a predetermined angle. The magnetic tape guide further includes at least a shaft of the rotary roller and a threaded portion fixed to the shaft, with a base retaining the magnetic tape guide thereon. The base includes a shaft hole into which the shaft is inserted, with a hole having a larger inner diameter than the shaft hole, and a threaded hole into which the threaded portion of the magnetic tape guide is threaded. A substantially cylindrical member, having an adequate resiliency, is provided between the large-inner-diameter hole and the shaft.

In a preferred form, the base has the threaded hole, the large-inner-diameter hole and the shaft hole in that order, with the threaded hole being located on the top. The inner diameter of the holes increases in an order of the shaft hole, the large-inner-diameter hole and the threaded hole.

DESCRIPTION OF THE PREFERRED EMBODIMENTS

Figure 1:
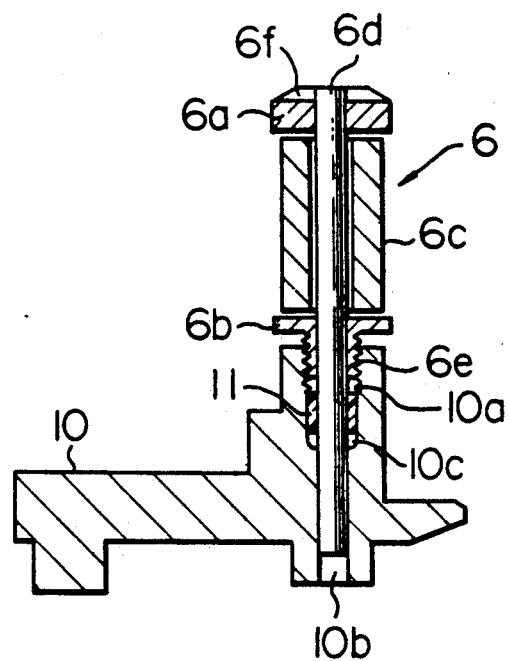
FIG. 1 is a cross-sectional view of a magnetic tape guide mechanism according to the present invention.
Figure 2:
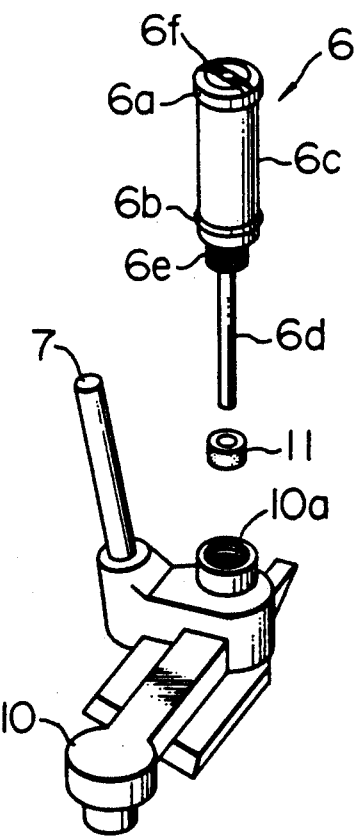
FIG. 2 is an exploded view of the magnetic tape guide mechanism according to the present invention.
Figure 3:
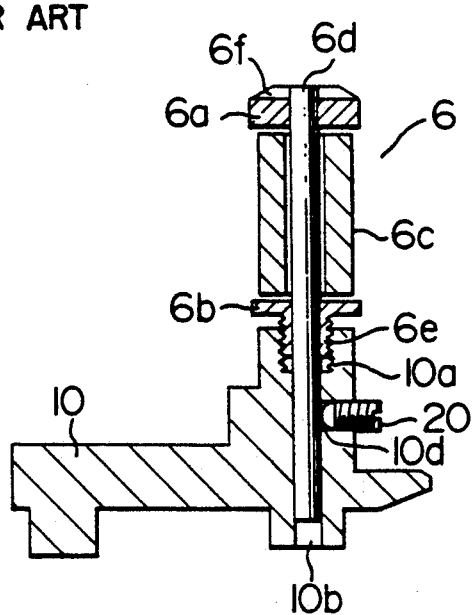
FIG. 3 is a cross-sectional view of a conventional magnetic tape guide mechanism.

In accordance with an embodiment of the present invention of FIGS. 1 and 2, the base 10 has a shaft hole 10b which extends in the vertical direction. A large-inner-diameter hole 10c having a diameter larger than the shaft hole 10b is provided above the shaft hole 10b. The large-inner-diameter hole 10c is connected to the shaft hole 10b. An internally threaded portion 10a is provided above the large-inner-diameter hole 10c in such a manner that it continues therefrom.

The rotary roller 6c is fitted onto the shaft 6d, and the upper and lower flanges 6a and 6b are fixed to the roller 6c near the two ends thereof to prevent removal of the roller 6c and to restrict the position of the magnetic tape 4 in the vertical direction. The upper and lower flanges 6a and 6b are separated from each other by a predetermined interval. Below the lower flange 6b is provided the externally threaded portion 6e. A cylindrical synthetic resin member 11, of adequate elasticity has an inner diameter slightly less than the outer diameter of the shaft 6d of the tape guide 6, and has an outer diameter substantially the same as or slightly larger than the inner diameter of the large-inner-diameter hole 10c in the base 10.

During assembly first, the synthetic resin member 11 is fitted into the large-inner-diameter hole 10c provided in the base 10. Next, the externally threaded portion 6e provided below the lower flange 6b of the tape guide 6 is threaded into the internally threaded portion 10a provided in the base 10 to a predetermined depth. The thus-arranged magnetic tape guide mechanism is mounted on a VTR. Next, the flat point driver is fitted in the groove 6f formed in the upper flange 6a of the tape guide 6, and the fine adjustment work is performed on the magnetic tape guide mechanism only by slightly rotating the tape guide 6 such that a predetermined reproduction output of a predetermined standard tape is at a maximum. In other words, loosening of the tape guide 6 can be prevented utilizing the impact resilience of the synthetic resin member 11, and no other loosening prevention means is necessary.

The shaft 6d of the tape guide 6 is pressed by the inner diameter portion of the synthetic resin member 11 fitted in the space formed between the large-inner-diameter hole 10c formed in the base 10 and the shaft 6d of the tape guide 6 utilizing the impact resilience of the synthetic resin member 11 (this is generated because the synthetic resin member 11 is pressed into the space). As a result, a suitable amount of friction is generated between the shaft 6d and the synthetic resin member 11 to prevent loosening of the shaft 6d.

Figure 4:
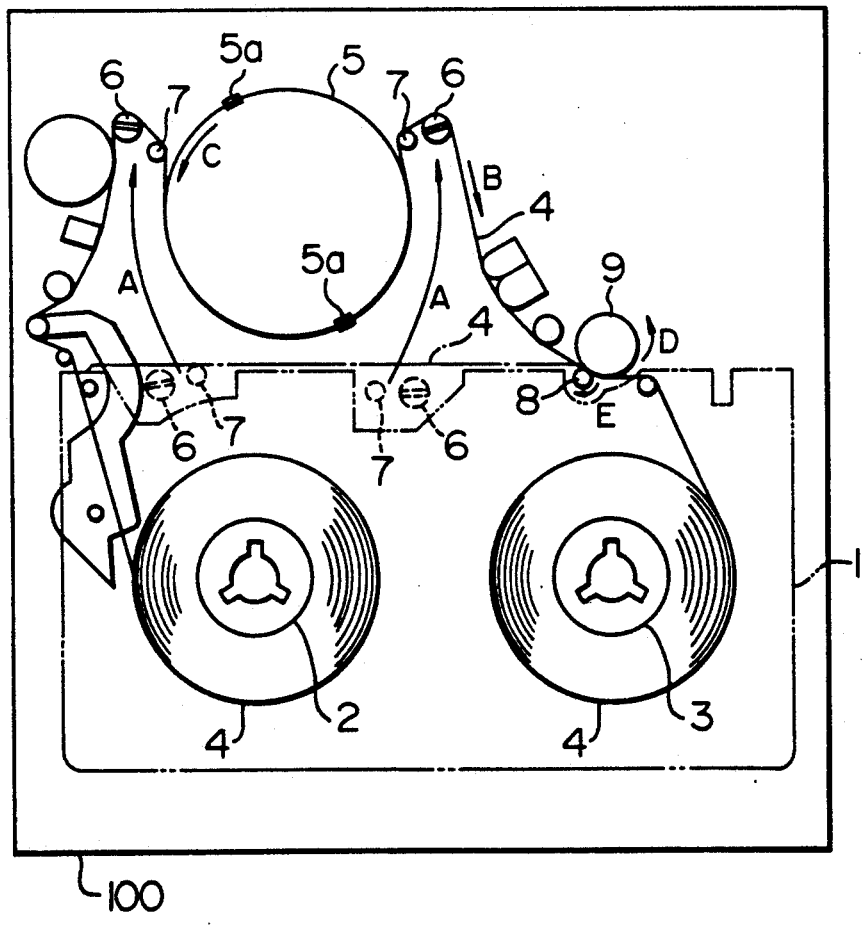
FIG. 4 is a plan view of a conventional magnetic recording/reproducing apparatus.
Figure 5:
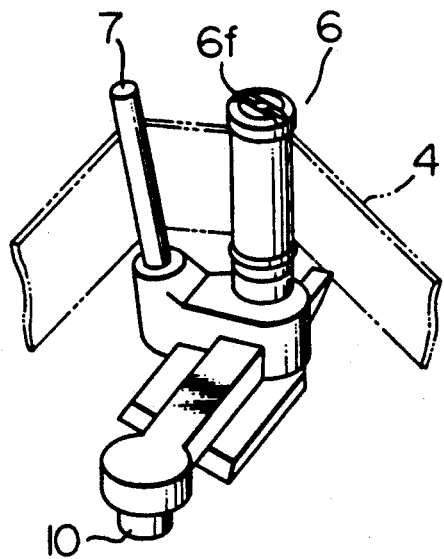
FIG. 5 is a perspective view of a conventional magnetic tape guide mechanism.

Since fine adjustment of the tape guide 6 is performed only by slightly rotating the tape guide 6, the efficiency is very high and production cost is reduced. Furthermore, since the use of the horizontal screw hole 10d and the fixing screw 20 (FIG. 4) required for preventing loosening is eliminated, production cost of the members is further reduced.

In the base 10 employed in the above-described embodiment, the internally threaded portion 10a, the large-inner-diameter hole 10c and the shaft hole 10b are provided in that order with the internally threaded portion 10a located at the top. However, as an alternative construction the large-inner-diameter hole 10c may be provided above the shaft hole 10b which is, in turn, provided above the internally threaded portion 10a. In that case, the synthetic resin member 11 is inserted between the portion of the shaft 6d located below the lower flange 6b fixed to the shaft 6d and the large-inner-diameter hole 10c, and the externally threaded portion 6e which engages with the internally threaded portion 10a is provided below the synthetic resin member 11. This alternative construction has the same effect as that of the embodiment of FIGS. 1 and 2.

What is claimed is:

1. A magnetic tape guide mechanism for a magnetic recording/reproducing apparatus, the magnetic tape guide comprising:

a magnetic tape guide having a cylindrical rotary roller for conveying a magnetic tape drawn out from a cassette in a state where the magnetic tape is would around a rotary cylinder with a magnetic head mounted thereon at a predetermined angle, said magnetic tape guide further having at least a shaft of said rotary roller and a threaded portion fixed to said shaft;

a base on which said magnetic tape is retained, said base having a shaft hole into which said shaft is inserted, a larger-inner-diameter hole having a larger inner diameter than said shaft hole, and a threaded hole into which said threaded portion of said magnetic tape guide is threaded; and a substantially cylindrical resilient member located in said large-inner-diameter hole and surrounding said shaft.

2. A magnetic tape guide mechanism according to claim 1, wherein said base has said threaded hole, said large-inner-diameter hole and said shaft hole in that order with said threaded hole located on the top, an inner diameter of said holes increasing in an order of said shaft hole, said large-inner-diameter hole and said threaded hole.

* * * * *